Sept. 1, 1964 A. A. MROS 3,147,420
ELECTRIC MOTOR BRAKING CONTROL SYSTEM
Filed Feb. 10, 1958 4 Sheets-Sheet 1

Albert A. Mros
INVENTOR.

BY
Attorneys

Sept. 1, 1964

A. A. MROS 3,147,420

ELECTRIC MOTOR BRAKING CONTROL SYSTEM

Filed Feb. 10, 1958

Albert A. Mros
INVENTOR.

BY
Attorneys

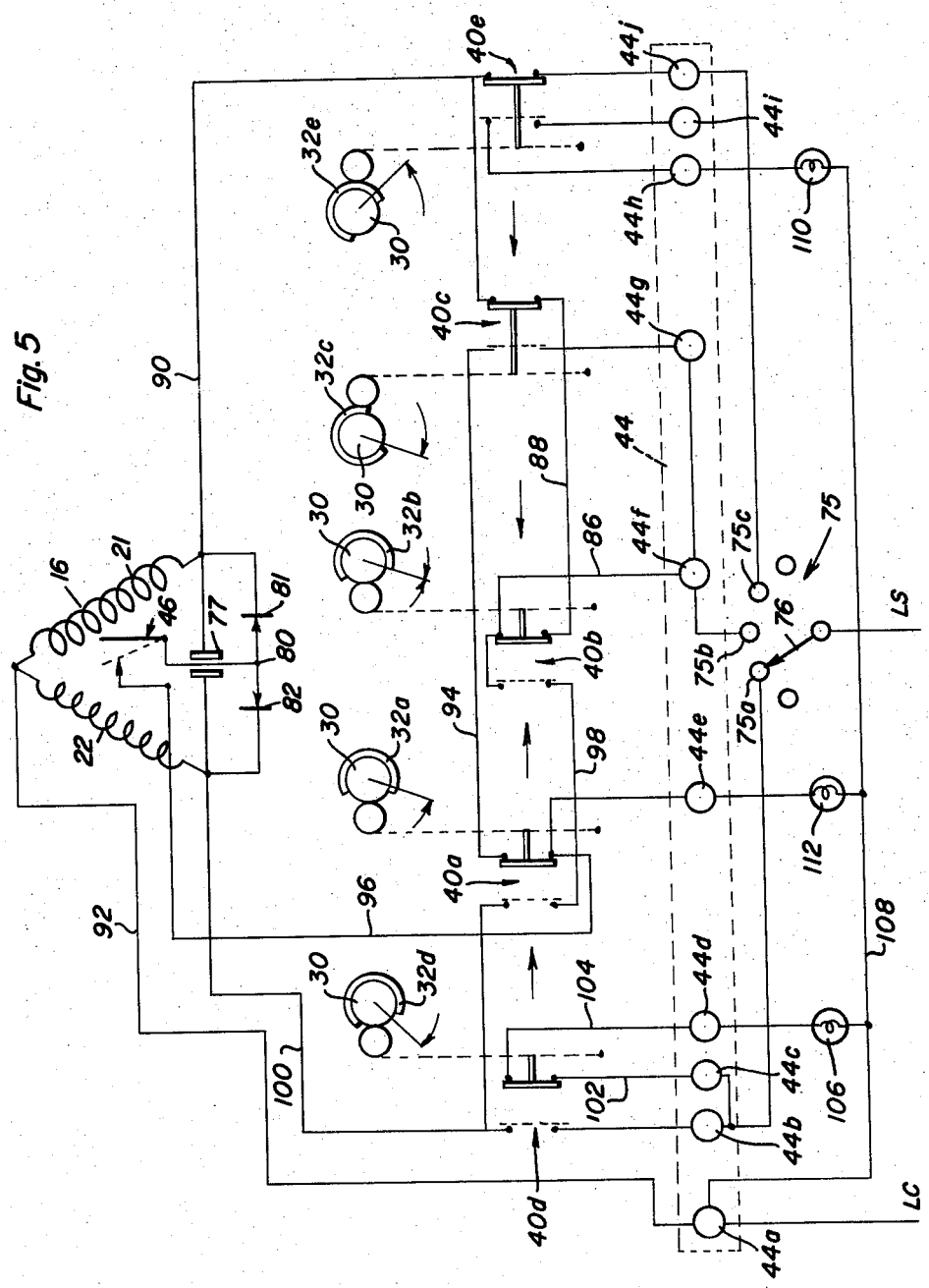

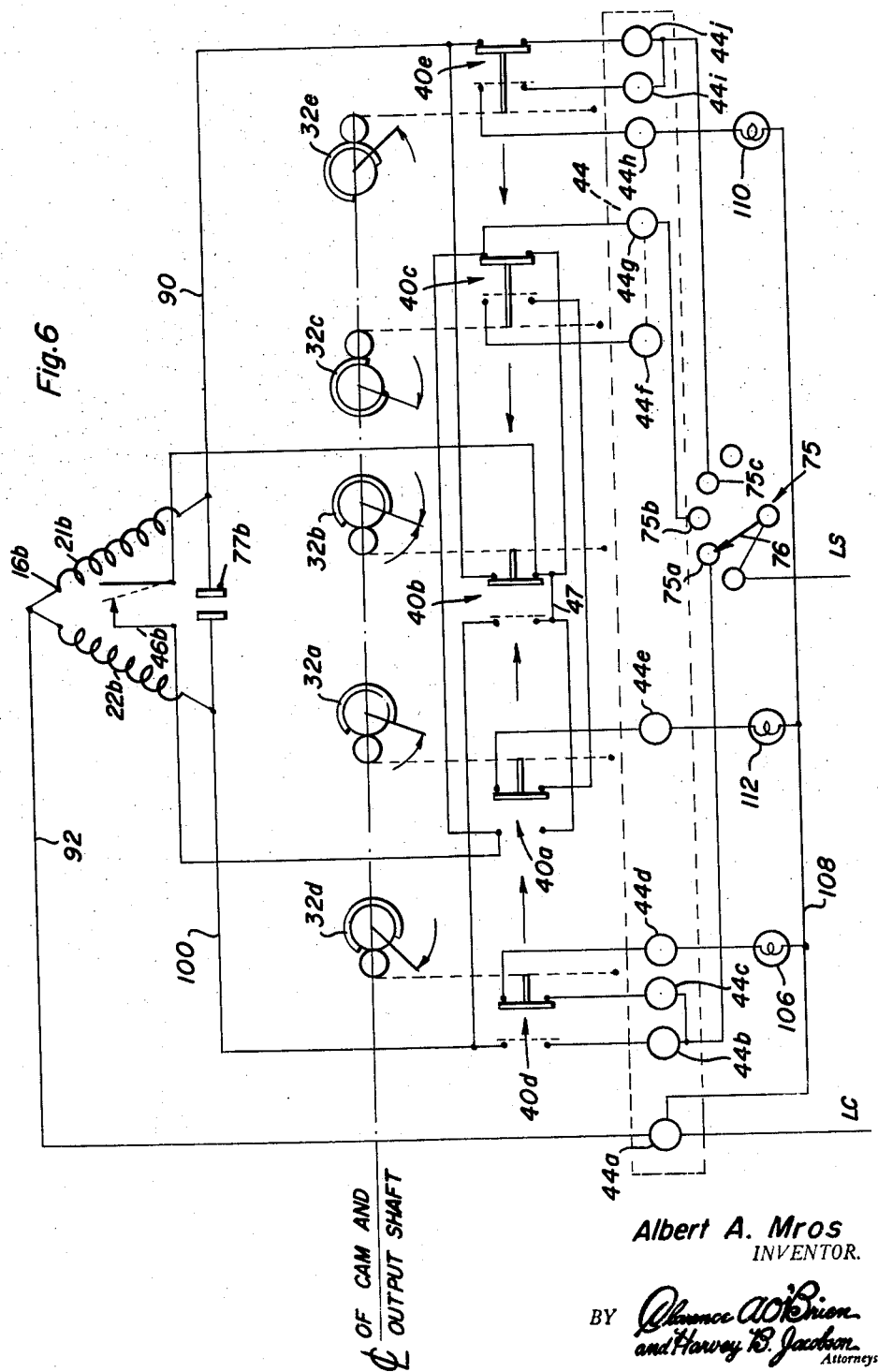

United States Patent Office 3,147,420
Patented Sept. 1, 1964

3,147,420
ELECTRIC MOTOR BRAKING CONTROL SYSTEM
Albert A. Mros, Ravenna, Ohio
(803 E. Alturas, Tucson, Ariz.)
Filed Feb. 10, 1958, Ser. No. 714,377
13 Claims. (Cl. 318—203)

This invention relates to braking systems for alternating current motors and more particularly to improved systems for either dynamically braking an alternating current motor by means of direct current or for plugging such a motor.

In accordance with the present invention, the braking circuit is interrupted when the motor is stopped by having a centrifugally closed switch monitoring the circuit at all times. The motor winding thus needs to carry the braking currents only momentarily. The switch is arranged so that it closes in response to rotation of the motor rotor. Accordingly, when the braking circuit is energized and the rotor is stopped, the switch that is operatively connected with the rotor, opens thereby opening the braking circuit.

A more comprehensive embodiment of the invention includes a group of switches in addition to limit switches that are arranged to be actuated when the motor has been operating for a period of time. The control circuits of the invention can be brought into play by limit switches that directly attach or indirectly attach to the rotor of the motor. The control circuit can be mechanically energized in some other way or it can be manually energized all depending on the desired application for the principles of the invention.

Certain arrangements can include intermediate switches for further controlling the operation of the control circuit or circuits and I have illustrated several selected circuit patterns that illustrate the principles on which the invention is based. Various other objects and features of importance will become apparent in following the description of the illustrated forms of the invention.

FIGURE 5 is a schematic wiring diagram showing another modification employing D.C. braking.

FIGURE 6 is a wiring diagram of a modification of the invention utilizing plugging.

Figure 1:
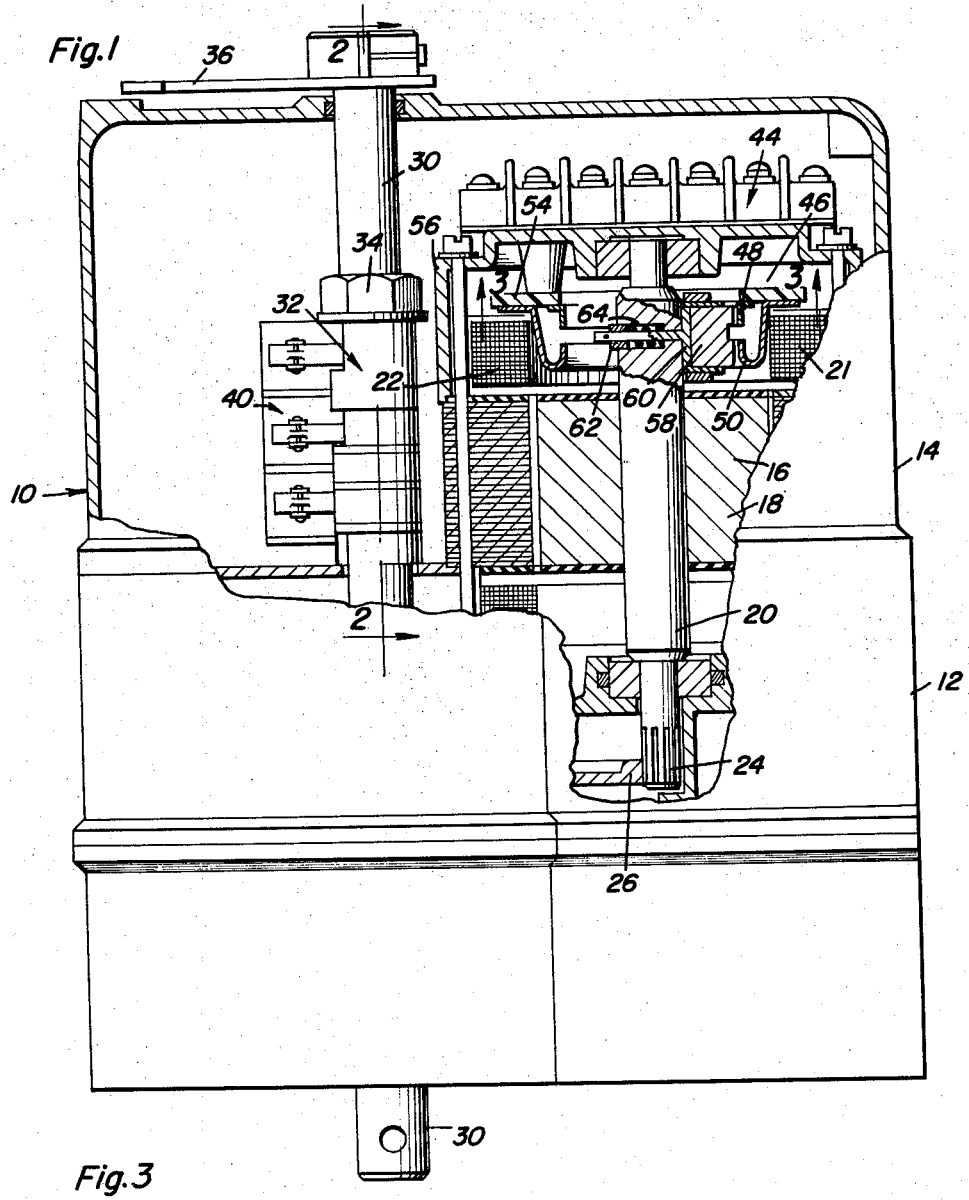
FIGURE 1 is an elevational view of a unit which has a motor, a control circuit constructed in accordance with the invention, and a power output shaft with which a group of switches are connected.

In the accompanying drawings (FIGURES 1 and 2) there is a unit 10 embodying an electric motor with the stopping control device of the present invention installed, which has a housing 12 with a removable cover 14. This unit is only partially illustrated since it is merely one structural adaptation of a motor such as an induction motor for which the retarding effect of the present invention would be useful. Motor 16 of unit 10 has a rotor 18 provided with a rotor shaft 20. The rotor may have windings such as the squirrel cage type. The rotor is located in the presence of stator windings 21 and 22 and has a pair of fixedly mounted spaced bearings that are designed to carry the loads imposed on them. Pinion 24 is meshed with gear 26 and this constitutes a part of a reduction gear transmission by which the output of rotor 18 powers load shaft 30. The transmission may include planetary gearing and/or include hydraulic or mechanical transmission components.

Figure 2:
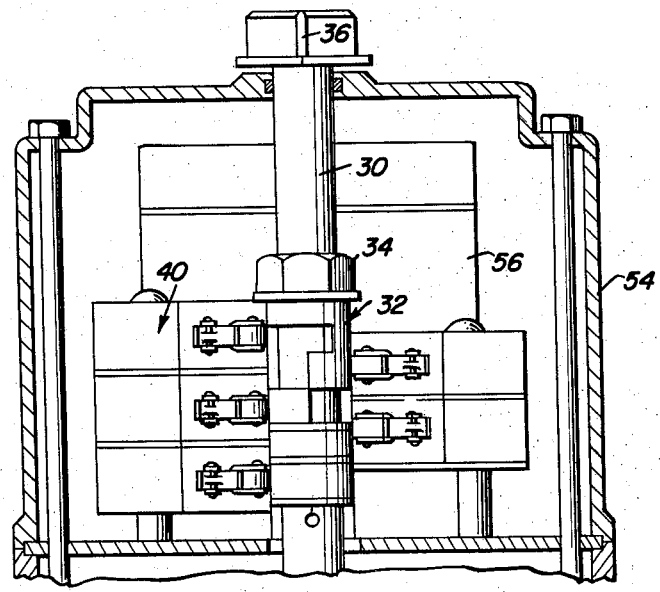
FIGURE 2 is a sectional view taken on the line 2—2 of FIGURE 1 and showing principally the group of cam operated switches that are actuated in response to the operation of the motor of FIGURE 1.

Shaft 30 has a group 32 of five cams 32a, 32b, 32c, 32d and 32e as seen in FIGURES 1 and 2 adjustably mounted on it within cover 14 and held in a fixed adjustment by jamb nut 34. Indicator arm 36 is attached to the upper end of shaft 30 to provide a visual indication of the angular disposition of the load that is coupled to or driven by shaft 30.

A bank 40 of five switches 40a, 40b, 40c, 40d and 40e are mounted in operative relation to the five cams of group 32 and are adapted to be actuated by the respective cams in response to rotation of shaft 30. Operation and functions of these switches will be hereafter explained. However, the two right-hand switches 40d and 40e as viewed in FIGURE 2 constitute an "off" limit switch and an "on" limit switch, respectively as will be further explained.

Terminal distributor block or strip 44 is mounted on the motor 16 and has various wiring connected with it for further connection within unit 10. A centrifugally controlled switch assembly 46 is actuated by the rotor 18 of motor 16 or by a part which is actuated at a rate of speed proportional to the speed of motor 16 to close the switch at a predetermined rotational speed. The centrifugally controlled switch includes two conductive rings 48 and 50 concentric with shaft 20 and carried by insulating panel 54 attached to casting 56 in unit 10 and located beneath cover 14. The conductive rings constitute fixed contacts of the switch 46 while spring returned, centrifugally actuated brush 58 slidably mounted adjacent one end of shaft 20 bridges the two rings to close the switch 46. The brush holder 60 is therefore weighted and has an arm 62 passed through a bore 64 that is formed transversely in shaft 20 as shown in FIGURES 1 and 3.

Figure 3:
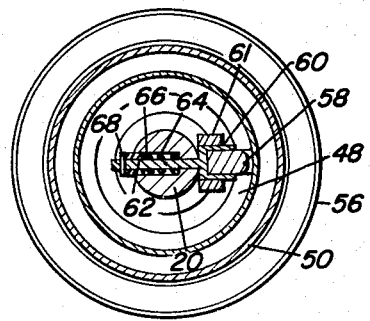
FIGURE 3 is a cross sectional view of the centrifugally closed switch which monitors the control circuit.

As shown in FIGURE 3 a counterbore is formed to receive spring 66 that reacts between an end of the counterbore and a transverse pin 68 carried by arm 62. The result is that the brush 58 with its brush holder 60 and weight 61 is spring-returned to the open switch position but is centrifugally operated against the bias of the spring 66 to the switch closed position (in contact with rings 48 and 50). Switch 46 is, therefore, designed to be opened when the motor is at rest and closed when the motor is rotating.

FIGURE 5 illustrates one form of electric dynamic retarding or braking control circuit for applying stopping current in the field coil windings of a motor. The five switches 40a through 40e as heretofore described are included in the system's circuit. A main selective conditioning control switch assembly 75 associated with the control circuit of FIGURE 5 is schematically represented as a multi-position switch with three operative contacts 75a, 75b and 75c. The movable contactor 76 has one side of the line (A.C. source) connected to it, identified as LS. The system of FIGURE 5 is particularly useful as a burner register drive control where the fuel mixture in industrial furnaces has to be accurately controlled utilizing the five switches 40a through 40e. The control switch 75 may then be remotely located, for example in a control room. The windings 21 and 22 of motor 16 are schematically represented with switch 46 shown by solid line as open and by dotted line as closed adjacent to the motor windings as hereinbefore described. The motor has a phase-shifting capacitor 77 to aid in starting and therefore the capacitor is schematically shown connected across the windings. Each of the switches 40 are movable between two positions in which a different pair of contacts are bridged in order to simultaneously open and close different conductive paths when actuated by an associated cam 32. The cams are all fixedly mounted in axially and angularly spaced relation to each other on the shaft 30 in order to sequentially actuate the switches from one position to the other as respectively shown by solid and dotted lines in FIGURE 5. The control switch assembly 75 is therefore selectively operative to condition the system for operation. When the contactor 76 engages contact 75a and the rotor is in one starting reference position as illustrated in FIGURE 5, line current from LS flows through terminal 44b, conductor 102, switch 40d, conductor 104, terminal 44d and lamp 106 to return line LC through line 108 connected to terminal 44a. The lamp 106 will therefore indicate that the system is set for stopping rotation in a counter-clockwise direction. To operate the motor, the movable contactor or blade 76 of the main control switch 75 is moved to contact member 75b. Current then flows from line LS to terminal 44f on terminal strip 44, then through conductor 86 and switch 40b to conductor 88 to switch 40c and from switch 40c to conductor 90 connected to motor winding 21. Current returns through conductor 92 connected in common to both windings 21 and 22, to line LC completing a circuit for starting the motor in the counter-clockwise direction. Switch 46 immediately closes because it is mounted on the rotor (FIGURE 1), while the switch actuating cams all fixed to the load shaft 30 but angularly oriented with respect to each other are rotated in one direction, for example counterclockwise.

Cam 32c is therefore initially effective to move switch 40c from its stop disabling position illustrated by solid line in FIGURE 5 to the dotted line position so that line current is disconnected from winding 21 through switch 40c but flows through terminal 44g and switch 40c to conductor 94 connected to switch 40a from which current flows through conductor 96 to the closed centrifugal switch 46 to the tap 80 between rectifiers 81 and 82 which would supply rectified in-phase stopping current to both windings 21 and 22 of the motor. The motor will stop instantly because the rectifiers apply rectified A.C. to the windings causing a large D.C. electromagnetic field to be produced and since this field is stationary, it stops rotation of the rotor. As soon as the rotor stops the centrifugal switch 46 will open the circuit. Rectifiers 81 and 82 may assume a number of configurations such as electron tubes, or a semi-conductor, selenium rectifier, etc. It will also be apparent that whenever the switches 40c and 40a are so positioned as to supply stopping current through switch 46, a conductive path is also established through terminals 44e and lamp 112 to indicate the stopped position of the rotor.

The cycle described is for counterclockwise rotation of the cams 32 effective to instantly stop the output shaft 30 after it has rotated to a predetermined position in that direction from the starting reference position. The system may then be reset for clockwise operation by moving the control switch contactor 76 to contact 75c. Line current is then connected to winding 21 through terminal 44j and through switch 40e to conductor 90 so as to resume rotation of the rotor from its stopped position until all of the cams 32 have thrown all the switches 40 to the opposite positions as shown by dotted line in FIGURE 5 whereupon line current is disconnected by switch 40e from winding 21 and the system would then be conditioned for clockwise operation. Also, line current will then flow to terminal 44j and through switch 40e to terminal 44h, and through lamp 110 to return line 108. Lamp 110 will therefore indicate that the system has been set for clockwise operation.

Should the control switch contactor 76 then be moved to contact 75b, line current would again flow from terminal 44f on terminal strip 44 through 86 to switch 40b but through the jumper thereof and the switch 40b in the dotted line position through conductor 98 to switch 40a for connection to motor winding 22 through conductor 100. Energization of winding 22 thereby starts the motor rotating together with the switch actuating cams in a clockwise direction. Cam 32a is then initially effective to actuate switch 40a from its dotted line position to thereby open the circuit therethrough. However, the current will flow from terminal 44g through switch 40c and conductor 94 to switch 40a in its stopping position for connection by conductor 96 to the centrifugally closed switch 46 to supply rectified stopping current to windings 21 and 22 of the motor causing the rotor to stop instantly and break the circuit as hereinbefore explained with respect to counterclockwise operation.

It is apparent that the motor can be controlled in such a manner that the output of shaft 30 can travel a preselected distance determined by the relative positions of the stop control cams 32a and 32c effective to stop rotation of the rotor between limits determined by cams 32d, 32e and 32a. In the embodiment of FIGURE 5 the cams 32d, 32a and 32b may be made in one-piece fixing the settings. Should this be the case the output shaft can be controlled in fine increments between both extremities of rotation and position.

Figure 4:
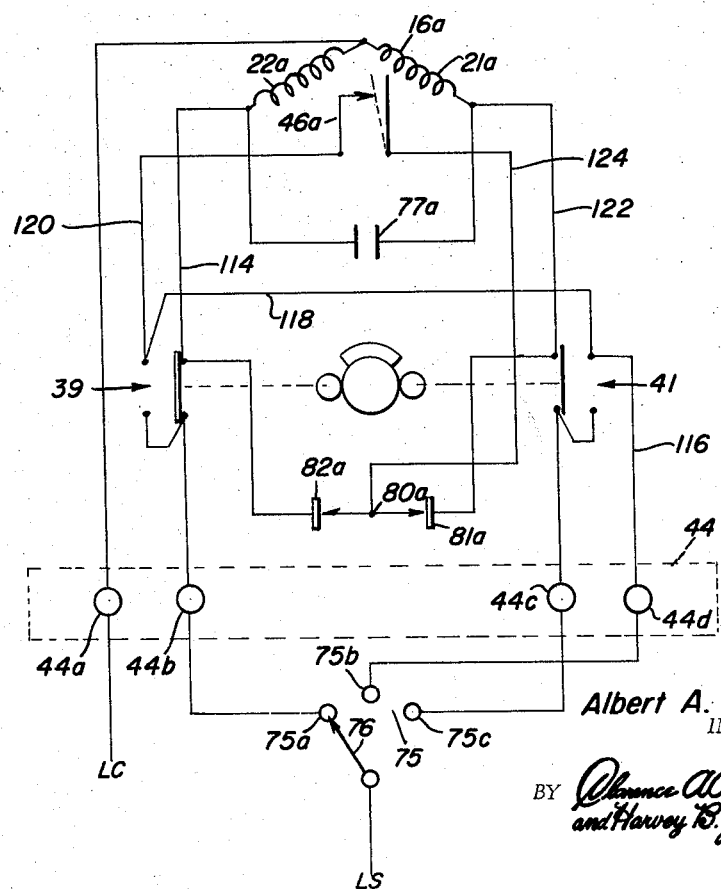
FIGURE 4 is a schematic wiring diagram showing a simplified system for dynamically braking an A.C. motor by supplying the windings with direct current.

Reference is now made to FIGURE 4 where a modification of the circuit of FIGURE 5 is illustrated. The modification consists in simplifying the circuit by omitting three switches and cams and the circuitry connected with them. Motor 16 has forward and reverse windings 21a and 22a with a motor being started with the aid of capacitor 77a selectively connected in series with either winding. The main control switch 75 again has three operative positions and is operatively connected to one side of an A.C. source line LS. From the line, movable contactor 76 of switch 75 receives current for supply to contact 75a whence it goes to terminal 44b on terminal strip 44 and then to switch 39. Line current is thereby conducted through line 114 to winding 22 thereby starting the motor inasmuch as the windings have a center tap connected to the common line of the A.C. source line LC through terminal 44a.

As soon as the rotor of motor 16a begins to move, centrifugal switch 46a closes to operatively condition switches 39 and 41 which are limit switches, responding in function to limit switches 40d and 40e of FIGURE 5.

At any time after the motor is running it may be made to stop instantly by throwing the control switch to contact 75b which causes current to flow to terminal 44d on the terminal strip 44 and then through conductors 116, 118 and 120 to the closed centrifugal switch 46a on the motor rotor. Thereafter, the stopping current flows through line 124 to the center tap 80a between rectifiers 81a and 82a which will direct rectified A.C. to both windings 21a and 22a of the motor through conductors 114 and 122 respectively. This causes the rotor to be in the presence of an intense stationary magnetic field opposing motion of the rotor in any direction thereby instantly stopping the rotor and causing switch 46a to open and break the rectifier circuit.

The motor may again be started by adjusting control switch 75 to contact 75a or 75c depending on the desired direction of operation. Instant stopping may again be effected by returning the contactor 76 to contact 75b. In this latter embodiment, as in all other embodiments, the stopping can be caused instantaneously by limit switches and by any of the intermediate switches of FIGURES 5 and 6. These will enter into different systems for which unit 10 is adapted. As to the embodiment of FIGURE 4 which is under immediate consideration, the stopping circuit may be used without the limit switches since the lead 120 from centrifugal switch 46a is directly connected to the terminal 44d of the terminal strip. Another contemplation of the invention is to omit terminal strip 44 in favor of other mechanical expedients. Rectifiers 81a and 82a may assume any conventional form such as rectifier based on the properties of a semi-conductor, or may be ordinary vacuum tubes.

Reference is now made principally to FIGURE 6 where another embodiment of the invention is illustrated. This embodiment is structurally similar to the embodiment of FIGURE 5 but the components thereof are electrically related as to operate as a "plugging" system. Motor 16b has forward and reverse windings 21b and 22b and the motor is provided with a capacitor 77b across the windings. Main control switch 75 has its movable contactor 76 operatively connected with one side of the A.C. source line LS. Beginning at control switch 75, the contactor 76 when moved to contact 75b provides a conductive path to terminal 44g on terminal strip 44 and then directly to the centrifugal switch 46b which is open. Another conductive path is also provided through switch 40c connected to terminals 44g to contacts of switch 40b and connection therethrough to the motor winding 21b. A circuit through winding 21b is therefore completed by connection thereof to terminal 44a which is a common of the A.C. source thus causing counterclockwise rotation of the rotor. This action closes centrifugal switch 46b on the rotor, thereby forming a parallel conductive path to switch 40b directly from terminal 44g, by-passing switch 40c.

By proper angular orientation of the cam 32, cam 32c actuates switch 40c first. The motor continues to run however since switch 40c is by-passed by closed switch 46a, until cam 32b next actuates switch 40b to interrupt the connection to the winding 21b. Switch 40b then also establishes a new conductive path for the current through the jumper 47 to the motor winding 22b tending to reverse the previous rotational direction of the motor and thereby cause it to stop. But at the instant the motor slows down sufficiently, centrifugal switch 46b opens and breaks the circuit.

The cycle described is for counterclockwise rotation of the cams and to instantly stop the motor output at a predetermined position displaced in that direction from a clockwise position. The intermediate switches 40c and 40b operated by their cams cause this to be achieved. This cycle may be reset for clockwise operation by actuating the main control switch 75 to contact 75c. Current is thereby supplied through terminal 44j and switch 40e to winding 21b for resuming counterclockwise rotation of the rotor causing the cams to actuate all of the switches to the opposite position as shown by dotted line in FIGURE 6 whereupon switch 40e disconnects the winding 21b.

Control switch blade 76 is then returned to contact 75b so that current from the terminal 44g also directly connected to a contact of switch 40a is conducted therethrough to switch 40b which in turn conducts the current to the motor winding 22b which would cause the cam shaft to rotate in a clockwise direction. The rotation would close centrifugal switch 46b forming a parallel path to switch 40b bypassing switch 40a so that when cam 32a initially actuates the switch 40a rotation continues until cam 32b actuates switch 40b to supply current to winding 21b for reverse torque stopping of the motor. This action would instantly stop the rotor by the formation of bucking currents in the windings. The centrifugal switch would open the path for current to the winding 21b when the rotor has slowed down and action would stop. Reset to counterclockwise operation may then be effected by contact 75a supplying current through terminal 44b and switch 40d to winding 22b for resuming clockwise rotation until the cams 32 restore the switches 40 to the solid line position shown in FIGURE 6.

It will therefore be apparent, that the control circuit of FIGURE 6 differs from that of FIGURE 5 in utilizing reversed torque by supplying line current to that winding which produces such torque in a direction opposite to the rotational direction of the rotor, rather than the use of rectified currents supplied into both windings as in the case of FIGURE 5. The operation of the circuit of FIGURE 6 is otherwise similar to that of FIGURE 5 and in particular in the manner in which the motor is conditioned for operation in either direction and with respect to the operation of the lamp devices to indicate the condition of the control system. Accordingly, lamp device 110 in FIGURE 6 is connected to terminal 44h for energization by current supplied thereto from the contacts 75c when the switch 40e is in its dotted line position since the contact 75c is connected to terminal 44i as well as to terminal 44j. Lamp device 110 therefore indicates the clockwise operational conditioning of the control system. Lamp device 106 on the other hand is connected to the control circuit in a manner similar to that described with respect to FIGURE 5. The stop indicating lamp device 112 is also operatively connected to the switch 40a through terminal 44c in order to indicate the stop position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus of the character described for operation and control of a single phase induction motor adapted to be energized from a single phase voltage source, said motor having first and second windings, said apparatus comprising a first circuit for impressing the source voltage on said windings, said first circuit including a capacitor in series with the second winding for shifting the phase of A.C. voltage impressed on the second winding, a second circuit bypassing the capacitor and including rectifying means connected directly to said windings around the capacitor, and switching means for selectively energizing the windings through said first circuit for running the motor and through said second circuit for braking the motor, said rectifying means comprising two rectifiers connected in opposing relation with respect to said first circuit whereby said second circuit is inoperative when said first circuit is operative.

2. The device of claim 1 in which said switching means comprises means selectively connecting the line to said second circuit intermediate said rectifiers to supply rectified D.C. voltage to both said windings.

3. Apparatus of the character described for operation and control of a single phase induction motor adapted to be energized from a single phase voltage source, said motor comprising first and second windings having corresponding ends in common connection with one side of the line, a capacitor interconnecting corresponding opposite ends of said windings, and switching means for connecting the other side of said line to one side of the capacitor whereby one winding will be energized directly from the line and the other winding will be energized through said capacitor from the line, similarly polarized half-wave rectifiers connected respectively to the said opposite ends of said windings and bypassing the capacitor, said switching means comprising means for alternatively connecting said other side of said line to said rectifiers whereby both of said windings will be supplied with in-phase rectified D.C. voltage.

4. The device of claim 3 in which said switching means further comprises means for alternatively connecting said other line to the other side of said capacitor for reversing said motor.

5. A braking system for a reversible electric motor comprising, circuit means for selectively establishing forward and reverse directions of rotation for said motor, position limit means selectively operable in response to predetermined positioning of said motor for conditioning said circuit means to establish rotation in either said forward or reverse directions, selective conditioning means for energizing said motor through said position limit means, stop control means selectively rendered operative in response to rotation of said motor by a predetermined amount from said predetermined position to establish a braking circuit for said motor, and means responsive to rotation of said motor through which said braking circuit is established operative to interrupt said braking circuit at speeds below a predetermined value.

6. The combination of claim 5, wherein said rotation responsive means includes switch means mounted for rotation by the motor and electrically connected to the windings to interrupt said flow of stopping current for rendering the stop control means inoperative when the motor approaches standstill.

7. The combination of claim 6, wherein said stop control means includes current rectifying means operatively connected to the windings through the speed responsive switch means for conducting D.C. current through the windings.

8. The combination of claim 5, wherein said stop control means includes switch means rendered operative by the conditioning control means in response to rotation of the rotor in one direction to reverse the torque produced by the windings.

9. The combination of claim 8, wherein said rotation responsive means includes centrifugal switch mounted for rotation by the motor and electrically connected to the switch means for rendering the switch means ineffective when the motor approaches standstill.

10. The combination of claim 5, wherein said position limit means comprises cam means driven by the motor and circuit controlling switch means sequentially actuated by the cam means for operatively connecting the windings to the selective conditioning means for supplying rotation inducing current thereto.

11. The combination of claim 5, wherein said stop control means includes current rectifying means operatively connected to the windings through the rotation responsive means.

12. The combination of claim 5 wherein said stop control means includes winding switch control means operative to reverse the torque produced by the windings, said rotation responsive means electrically connecting the winding switch control means to the selective conditioning means for supplying rotation retarding current to the windings in response to rotation of the rotor.

13. The combination of claim 12, wherein said position limit means comprises cam means driven by the motor for conditioning the winding switch control means and circuit controlling switch means sequentially actuated by the cam means for operatively connecting the windings to the conditioning control means for supplying rotation inducing current thereto.

References Cited in the file of this patent

UNITED STATES PATENTS

| | | |
|---|---|---|
| 2,154,314 | Minneci | Apr. 11, 1939 |
| 2,259,330 | Snyder | Oct. 14, 1941 |
| 2,376,299 | Wendelberg et al. | May 15, 1945 |
| 2,424,306 | Renault | July 22, 1947 |
| 2,595,334 | Weingarden | Aug. 21, 1951 |
| 2,637,007 | Picking et al. | Apr. 28, 1953 |
| 2,740,932 | King | Apr. 3, 1956 |
| 2,837,708 | Jones et al. | June 3, 1958 |
| 2,869,061 | Pinney | Jan. 13, 1959 |